(12) United States Patent
Lubecki

(10) Patent No.: US 8,313,154 B2
(45) Date of Patent: *Nov. 20, 2012

(54) BICYCLE WHEEL HAVING FLEXIBLE SPOKES

(76) Inventor: Timothy Lubecki, North Haven, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/134,574

(22) Filed: Jun. 10, 2011

(65) Prior Publication Data

US 2011/0241412 A1    Oct. 6, 2011

Related U.S. Application Data

(63) Continuation of application No. 12/284,905, filed on Sep. 26, 2008, now Pat. No. 7,988,240.

(51) Int. Cl.
*B60B 1/04* (2006.01)

(52) U.S. Cl. .............................. 301/59; 301/57; 301/104
(58) Field of Classification Search .................... 301/55, 301/56, 57, 59, 61, 104; 403/275
See application file for complete search history.

(56) References Cited

U.S. PATENT DOCUMENTS

| 4,585,277 A * | 4/1986 | Watanabe ...................... 301/56 |
| 7,178,239 B2 * | 2/2007 | Meggiolan et al. ......... 29/894.342 |
| 7,651,172 B2 * | 1/2010 | Meggiolan ................. 301/110.5 |

* cited by examiner

*Primary Examiner* — Kip T Kotter
(74) *Attorney, Agent, or Firm* — Timothy Lubecki

(57) ABSTRACT

A spoked wheel is described that uses flexible spokes having a termination on each end that couple with a rim using nipples. The flexible spokes are supported mid-span by a hub flange cradle that transfers torque from the hub to the rim via two sub-spokes. The hub flange cradle determines whether a sub-spoke is tangential or radial. A plurality of spokes may be used on each side of the wheel.

10 Claims, 6 Drawing Sheets

BICYCLE WHEEL HAVING FLEXIBLE SPOKES

CROSS REFERENCE TO RELATED APPLICATIONS

This application is a continuation of U.S. patent application Ser. No. 12/284,905, entitled "BICYCLE WHEEL HAVING FLEXIBLE SPOKES," filed on Sep. 26, 2008 now U.S. Pat. No. 7,988,240, the disclosure of which is incorporated herein by reference in its entirety.

BACKGROUND OF THE INVENTION

The invention relates generally to a spoked wheel that includes a hub, a wheel rim, and a plurality of spokes that transfer torque from the hub to the rim. More specifically, the invention relates to a spoked wheel that uses flexible spokes.

Performance bicycle wheels are a compromise between weight, and static and dynamic stability. While reducing weight, structural strength must be maintained.

The spokes of a bicycle wheel and their lacing pattern determine the static and dynamic stability of the wheel. This is most important in rear wheels, because the spokes couple the driving torque from the hub to the wheel rim. Torque transfer must occur with maximum efficiency to maximize the energy exerted by a cyclist.

A typical spoked wheel has a first set of spokes under tension on one side of the wheel, coupling the rim to a corresponding hub flange and a second set of spokes under tension on the opposite side of the wheel, coupling the rim with a corresponding hub flange. The two hub flanges are set at an axial distance from each other. When the wheel is viewed in section, the hub, spokes, and rim approximate a triangle.

The spokes on the two sides of the wheel have a camber angle with respect to the median plane of the wheel. The camber angles relate to a wheel's dish. The angles cause the spoke tensioning to give rise to force components in a direction parallel to the axis of the wheel. Balancing the force components keeps the rim centered in the median plane.

A rear wheel hub carries at one end a sprocket cassette which is part of the bicycle transmission (drive train) and requires axial space. The spokes set on the drive train side have camber angles that are smaller than the camber angles of the spokes on the opposite side. This requires the smaller camber angle spokes be tensioned more than the opposite side spokes that have greater camber angles in order to maintain the rim position in the median plane of the wheel. Different spoke camber angles may also appear in front wheels, where the hub may be occupied by a brake disk. However, most symmetrically dished front wheels carry less weight and do not have to deal with large torsional loads.

FIG. 1 shows a partial section view of a prior art rear bicycle wheel 101. The wheel 101 comprises a hub 103, a sprocket cassette 105 coupled to the hub 103, a rim 107 and tire 109. The hub 103 is coupled to the rim 107 via A (drive train) spokes and B (non-drive side) spokes. The wheel's median plane M is orthogonal to the hub axis X midpoint. The A spokes located at the drive train hub flange 111 have a camber angle $\alpha$ with respect to the wheel's median plane M. The B spokes located at the non-drive side hub flange 113 have a camber angle $\beta$ with respect to the wheel's median plane M. $\alpha$ is less than $\beta$. Each spoke is tensioned with a given tensile force. Corresponding tensile component vectors $T_A$ and $T_B$ are applied to opposite sides of the wheel 101. The horizontal vector components $T_{AO}$ and $T_{BO}$ of $T_A$ and $T_B$ are in a direction parallel to the axis X.

For wheels having an equal number of spokes on each side of the wheel, the horizontal vector components $T_{AO}$ and $T_{BO}$ must be balanced with one another. These forces maintain the rim 107 in the median plane M. However, the tensile force $T_A$ must be greater than the tensile force $T_B$ due to its smaller camber angle. The ratio between the tensile force $T_A$ and $T_B$ must be approximately equal to and opposite to the ratio of the sines of the camber angles $\alpha$ and $\beta$. This template applies to each pair of opposing spokes and as a sum with reference to the total tensile forces of the spokes on one side and the opposite side.

Conventional spokes have at one end threads for engaging a nipple to couple the spoke to a rim, and at the other end an elbow and a head for coupling with a bore of a hub flange. Spokes are made of different types of materials and may be butted, with reduced thickness of the spokes at the center section. The nipple is used to adjust spoke tension. The nipple is usually located at the rim end of the spoke, but may be located at a hub flange. Spokes are usually circular in cross section, but may be flat or oval cross-sectioned to improve rotation aerodynamics.

Most bicycle wheels on single rider bicycles have 28, 32 or 36 spokes, while wheels on tandem bicycles have 40 or 48 spokes. Wheels with fewer spokes have an aerodynamic advantage as the aerodynamic drag from the spokes is reduced. However, fewer spokes results in a larger section of the rim being unsupported, thereby requiring stronger rims.

Conventional spoke lacing patterns that transfer torque from the hub to the rim for driven wheels, or wheels with drum or disc brakes, typically require a tangential lacing pattern. The spokes leave the hub at an angle close to 90° (tangential) or at various angles, and usually cross other spokes to the rim.

Tangentially laced wheels transfer torque because one half of the spokes, called leading spokes, point in the direction of rotation, while the other half, called trailing spokes, point in the opposite direction. The leading and trailing spokes counteract each other when no torque is applied. When forward torque is applied during acceleration, the trailing spokes experience a higher tension while the leading spokes relax. The opposite occurs when braking, with leading spokes experiencing greater tension and trailing spokes relaxing. Leading and trailing spokes allow for the transfer of force in either direction, minimizing tension changes, and due to symmetry, allows the wheel to stay true regardless of the torque applied.

Wheels which are not required to transfer significant amounts of torque from the hub to the rim may use radial lacing. In radial lacing, the spokes leave a hub flange at zero degrees without crossing another spoke. Radial lacing cannot adequately transfer torque because torque on the hub would induce a stress in the hub flange bore, spoke elbows and nipples, and rim, increasing the likelihood of failure in any one of them. Radial lacing increases the stress on the hub flange since spoke tension pulls straight at localized points. While radial lacing uses shorter spokes which minimize weight, it is offset by the need to use a stronger hub. However, radially-laced wheels are stiffer and more precise than other lacing patterns.

A mix of radial and tangential lacing may be used on rear wheels with tangential lacing on the drive train side and radial lacing on the opposite side. Most of the torque is transferred by the drive train side of the hub while the opposite side stabilizes the wheel. A wrong-way, half-radial lacing may be used, with radial lacing on the drive train side and tangential lacing on the opposite side. This accounts for wheel dish, the drive train side spokes have greater tension and should not be burdened with transmitting drive torque. This design requires the hub to transmit torque from the drive train side to the opposite side. Many other lacing patterns exist. However, most are for aesthetic reasons.

What is desired is a bicycle wheel that offers reduced weight while allowing for increased performance.

SUMMARY OF THE INVENTION

The inventor has discovered that it would be desirable to have a light-weight high-performance bicycle wheel without the limitations imposed by conventional spoke designs. Embodiments teach a wheel using flexible spokes having a termination on each end that couple with a rim using nipples. The flexible spokes are supported mid-span by a hub flange cradle that transfers torque from the hub to the rim via two defined sub-spokes. The hub flange cradle determines whether a sub-spoke is tangential or radial. A plurality of spokes may be used on each side of the wheel.

One aspect of the invention provides a bicycle wheel having flexible spokes. Bicycle wheels according to this aspect of the invention include a wheel rim having a predefined even number of spoke couplings along an inner circumference, the wheel rim further having a surface for attachment of a bicycle tire, flexible spokes having a length defined by two end terminations, wherein a termination couples with a spoke coupling, and a rotatable wheel hub comprising a hub body positioned approximately at a rotational center of the wheel rim, a left flange separated by a predefined axial distance along the hub body from a right flange, the left and right flanges extend radially outward toward the wheel rim from the hub body and have a radial edge, a left flange outer surface that converges towards the wheel rim spoke couplings and a right flange outer surface that converges towards the wheel rim spoke couplings, and means for securing a flexible spoke onto the left and right flange outer surfaces.

Another aspect of the invention provides means for securing a flexible spoke. Securing means according to this aspect of the invention include a first cradle located on the outer surface of the left flange, and a second cradle located on the outer surface of the right flange, each cradle comprising a groove having two ends that open at a flange radial edge, a groove cross section configured to receive a flexible spoke, and a curve defined between the groove ends.

Another aspect of the invention provides a wheel hub for a spoked wheel. Wheel hubs according to this aspect of the invention include a hub body, a left flange separated by a predefined axial distance along the hub body from a right flange, the left and right flanges extend radially from the hub body and have a radial edge, and a left flange outer surface that converges towards a wheel median plane which is orthogonal to a hub axis midpoint and a right flange outer surface that converges towards the wheel median plane, and means for securing a flexible spoke onto the left and right flange outer surfaces.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

Embodiments of the invention teach a spoked wheel having a rim and a hub, and a plurality of flexible spokes that couple the hub to the rim based on tensegrity. Tensegrity refers to the integrity of structures as a synergy between balanced tension and compression components. Tension is continuous and compression is discontinuous such that continuous pull is balanced by equivalently discontinuous pushing forces. Embodiments use a plurality of flexible spokes on each side of a wheel and a hub having a corresponding number of cradles that may be located on the inner and/or outer surfaces of each hub flange.

Figure 1:
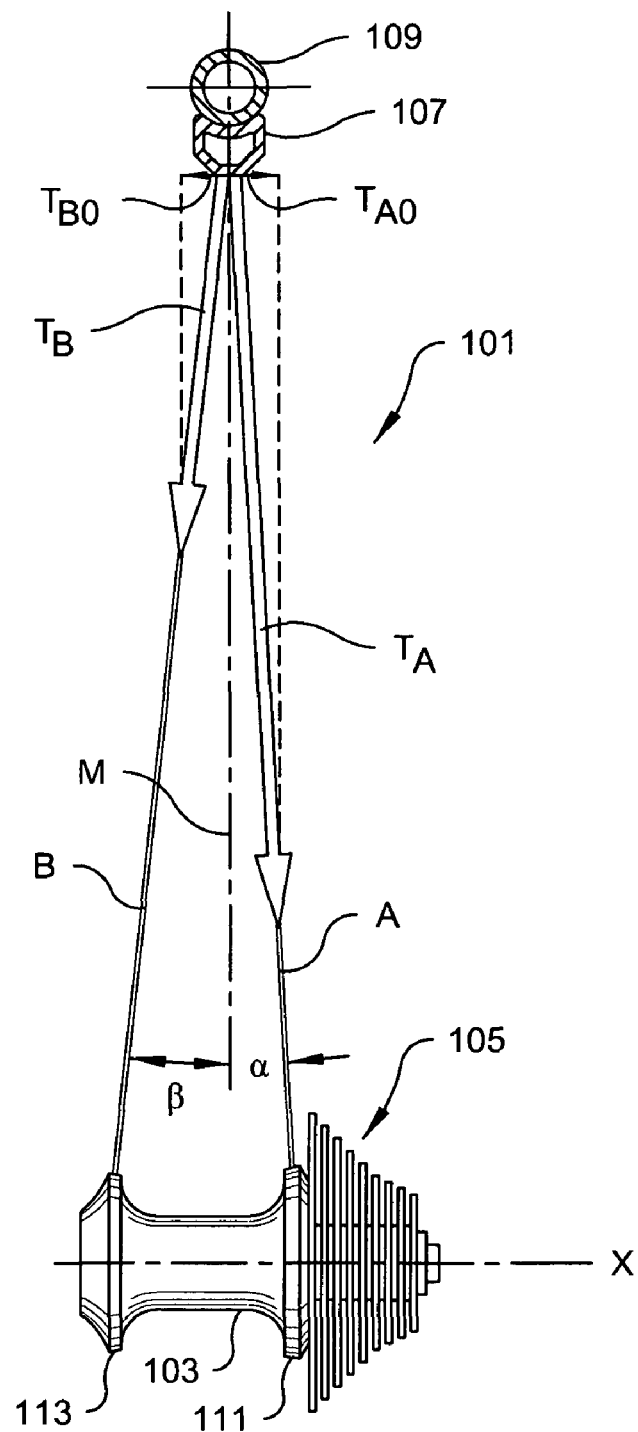
FIG. 1 is a partial section view of a prior art rear bicycle wheel.
Figure 2:
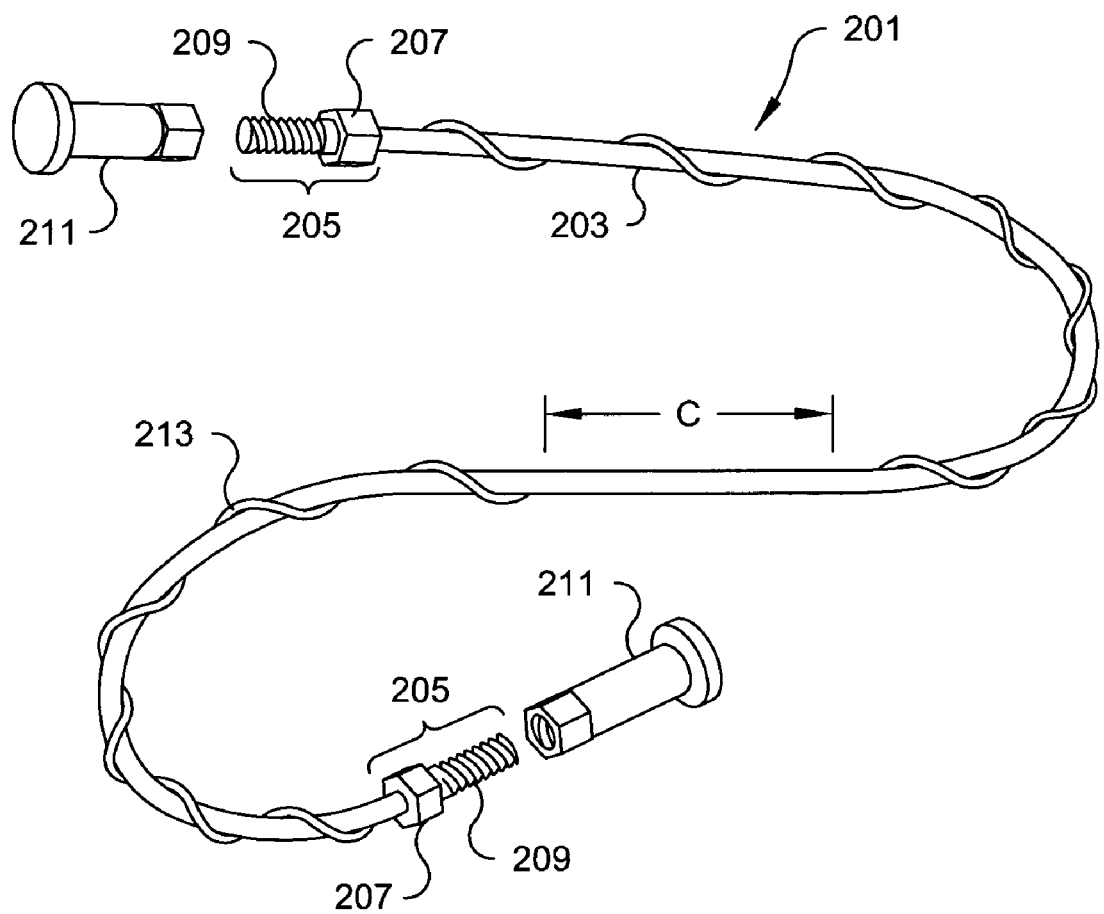
FIG. 2 is an exemplary flexible spoke.

FIG. 2 shows an exemplary flexible spoke 201. Each spoke 201 comprises a cable 203, which may be of a synthetic material, and two end terminations 205. An end termination 205 includes a region with surface flats 207 configured to receive a tool to prevent the cable 203 from twisting during wheel assembly and a threaded region 209 in matching correspondence with threads of a nipple 211 for coupling with a rim and for tension adjustment. The spoke 201 cable 203 may include an external jacket with modifications, such as a helical spiral 213, tailored to eliminate Aeolian induced resonance modes and to enhance aerodynamic properties. Aeolian resonance, or vibration, is the result of vortex shedding that creates an alternating pressure imbalance. If an external jacket modification is employed, a predefined region C where the spoke 201 is supported by a hub flange cradle remains unmodified.

Figure 3:
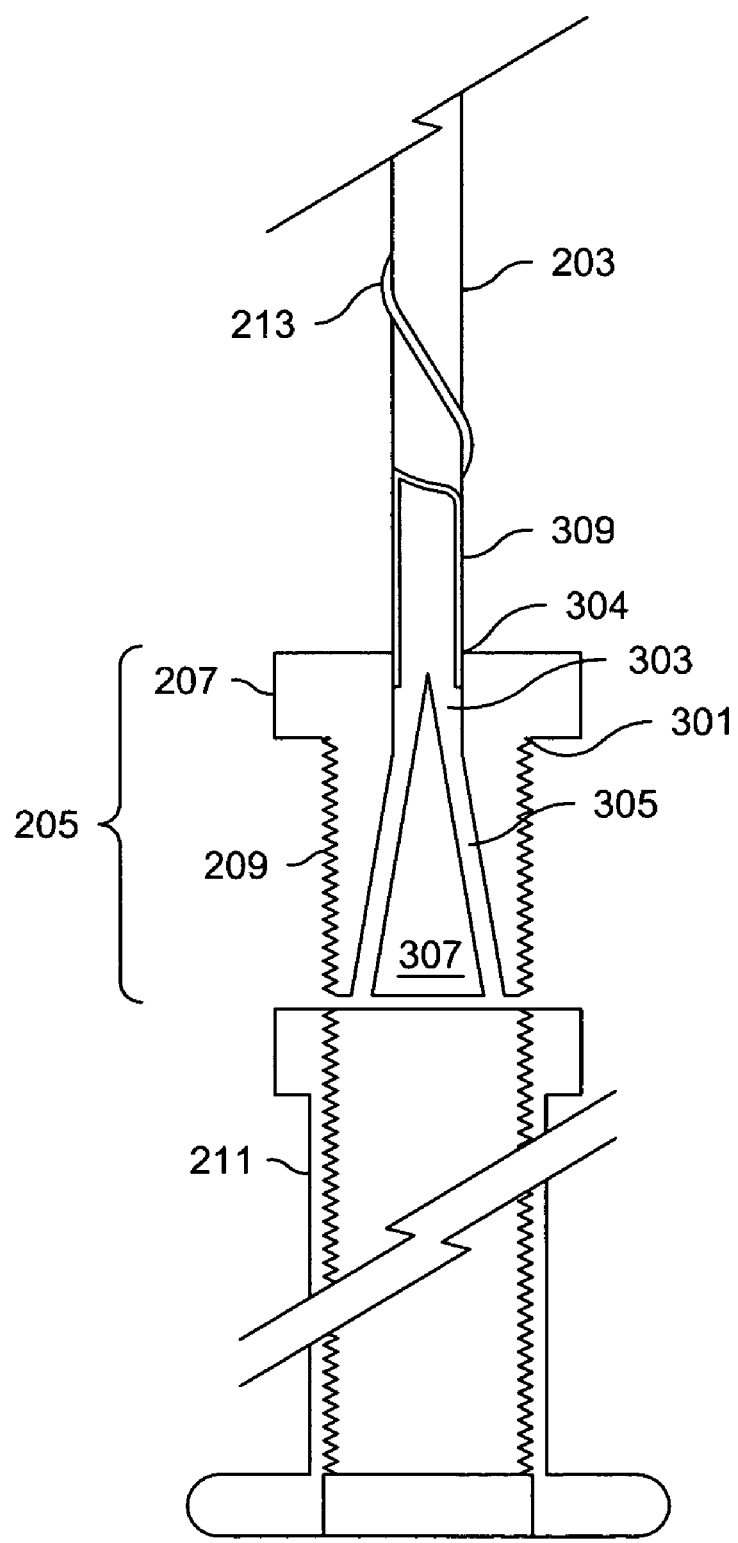
FIG. 3 is a section view of the termination and nipple in FIG. 2.

FIG. 3 shows a section view of the termination 205 and nipple 211. Each termination 205 has a terminal 301 having a hollow, expanding interior cavity 303. The terminal 301 may be made from hard-coated aluminum, titanium, stainless steel, or other material compatible with the cable 203. The terminal 301 may be treated to avoid galvanic corrosion, or corrosion, for example, between metal and carbon.

For composite cables 203, the individual cable fibers pass into the terminal 301 through an aperture 304 and a high-performance resin 305 is infused into the terminal interior cavity 303. The resin encapsulates and bonds each individual fiber strand to each other, to the inside surface of the cavity 303, and to a cone-shaped plug 307 made from compatible materials with its wider end at the terminal 301 end. The result after curing is a spoke 201 cable 203 end entrapped within the terminal 301. The plug 307, which may be a cone or truncated cone, uses wedge mechanics to increase holding power. The terminal 301 interior 303 geometry conforms to the cone-shaped plug 307 outside geometry, and as tension on the cable 203 increases, the compression load of the plug increases, gripping the individual fibers and distributing the compressive force evenly over the full length of the fiber bundle.

Cables 203 made from high modulus fibers are typically stronger than equivalent size wire cable and have a higher fatigue resistance over steel cable. Depending on the fiber and construction, the core strength member may be designed to be 4 to 7 times lighter than the size and strength equivalent wire cable. Each fiber type has unique characteristics and may be selected depending upon the application. Fiber types include Ultra High Molecular Weight Polyethylene (UHMWPE), also known as High-Modulus Polyethylene (HMPE) or High-Performance Polyethylene (HPPE), Liquid Crystal Polymer (LCP) fiber, Aramid, Polybenzobisoxazole (PBO), Polyester, Polyamide, and others. Synthetic cables offer greater strength-to-weight ratios, lower coefficients of thermal expansion, and higher moduli of elasticity than conventional steel components.

The cable 203 fibers may be formed as parallel fiber cables, twisted strand fiber cables, single braid fiber cables, double braid fiber cables, and other configurations, depending on the strength, allowable elongation, and bending radius. The cable 203 may be coated or jacketed 309 for protection. The jacket 309 may include external modifications to obviate Aeolian induced resonance and improve wheel aerodynamics.

Figure 4:
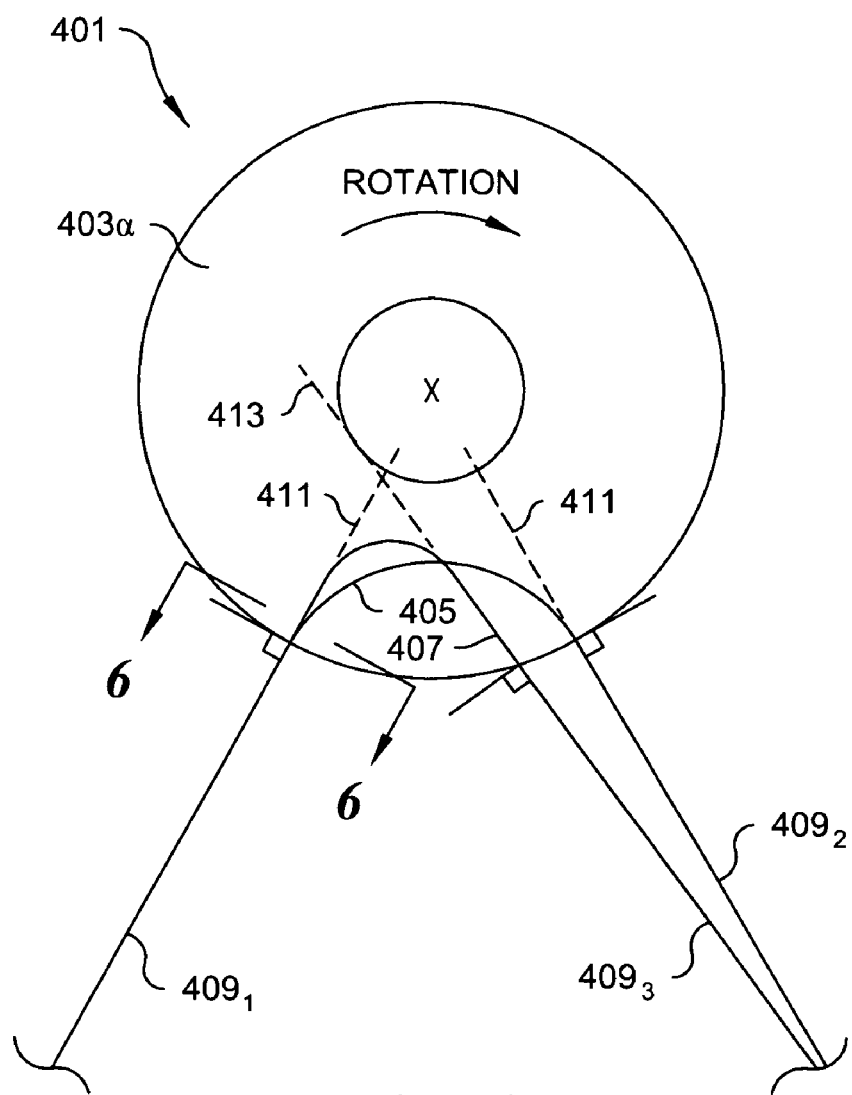
FIG. 4 is an exemplary axial view of a drive train side hub flange cradle and sub-spoke geometry.
Figure 5:
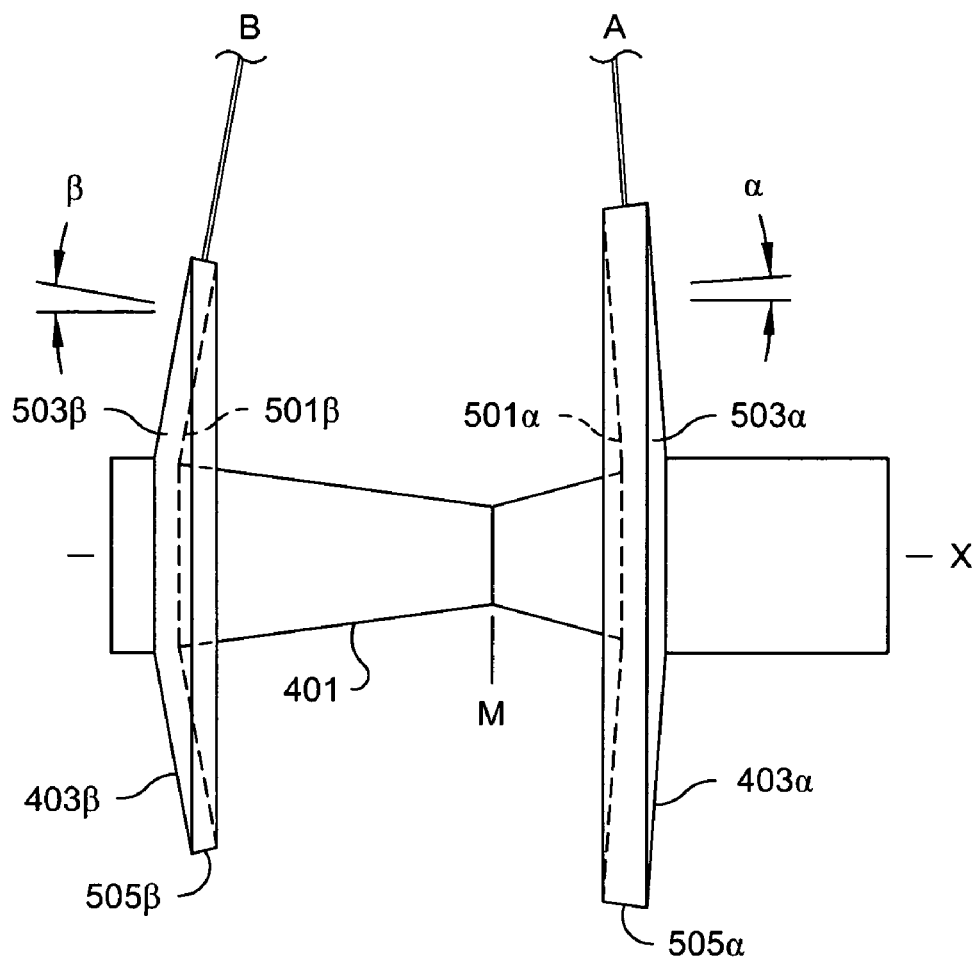
FIG. 5 is an exemplary hub.

FIG. 4 shows a hub 401 flange 403α spoke 201 cradle geometry. FIG. 5 shows a hub 401 side view (without cassette) showing left and right hub flanges 403α, 403β and inner 501α, 501β, outer 503α, 503β and radial edge 505α, 505β surfaces. The complete hub 401, or various hub components (body, flanges, bearing races, bearing seats, and others) may be made from hard-coated aluminum, titanium, stainless steel, or other material compatible with the cable 203. The spoke 201 terminals 205 couple with nipples 211, which couple the spoke 201 to a rim at two different rim locations. Each spoke 201 is supported by a hub flange 403α, 403β cradle c 405, 407 at a predetermined region C. The C region effectively separates each spoke 201 into two sub-spokes $409_1, 409_2, 409_3$. Each sub-spoke has a predetermined geometry with respect to the hub axis X, defined by a cradle c 405, 407. As in conventional wheels, the sub-spokes $409_1, 409_2, 409_3$ may be oriented radially, tangentially, or as a combination.

Figure 6:
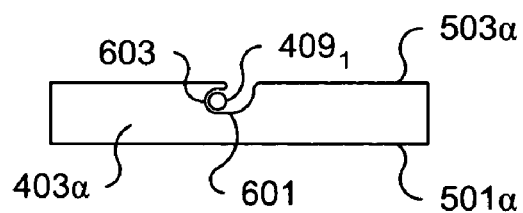
FIG. 6 is an exemplary cradle section view.

FIG. 4 shows two sub-spoke orientations. Radial lacing is defined by a sub-spoke $409_1, 409_2$ that enters the hub flange 403α perpendicular 411 to a hub tangent. A cradle 405 may be machined, molded or forged in the hub flange 403α inner 501α or outer 503α surface. FIG. 6 shows a section view of a cradle. A cradle is a groove having a predefined curve, and length with an undercut load bearing curved surface 603 profile 601 sized in matching correspondence with a spoke 201 cable 203, $409_1$ diameter. The cradle curve for two radial sub-spokes $409_1, 409_2$ may be a radius. The cradle groove 601 allows for the spoke 201 to fall into the hub flange 403α during assembly, but is captured and secured after all wheel spokes 201 are tensioned.

Each hub flange 403α, 403β has a predetermined camber angle α and β as defined by the hub 401 width, hub flange 403α, 403β effective diameter, sub-spoke length and rim height 107 geometry. The camber angles α and β are approximately parallel with the sub-spokes and result in a hub flange 403α, 403β having a hollow cone shape and having inner 501α, 501β and outer 503α, 503β surfaces at the camber angles α and β.

For sub-spokes entering a hub flange at an angle that is not perpendicular 413 to a hub tangent, a cradle 407 may have a curve and length defined by, for example, a Bézier curve. A Bézier curve is a parametric curve used to model smooth curves. Quadratic and cubic Bézier curves may be used and are suited for Computer Numerical Control (CNC) machining. A non-radial cradle 407 may be configured to support two non-radial sub-spokes, or a combination of a radial sub-spoke $409_1$ and a non-radial sub-spoke $409_3$, or two non-radial sub-spokes. The non-radial sub-spokes function as leading and trailing spokes. The non-radial sub-spoke $409_3$ in FIG. 4 functions as a trailing spoke.

Figure 7:
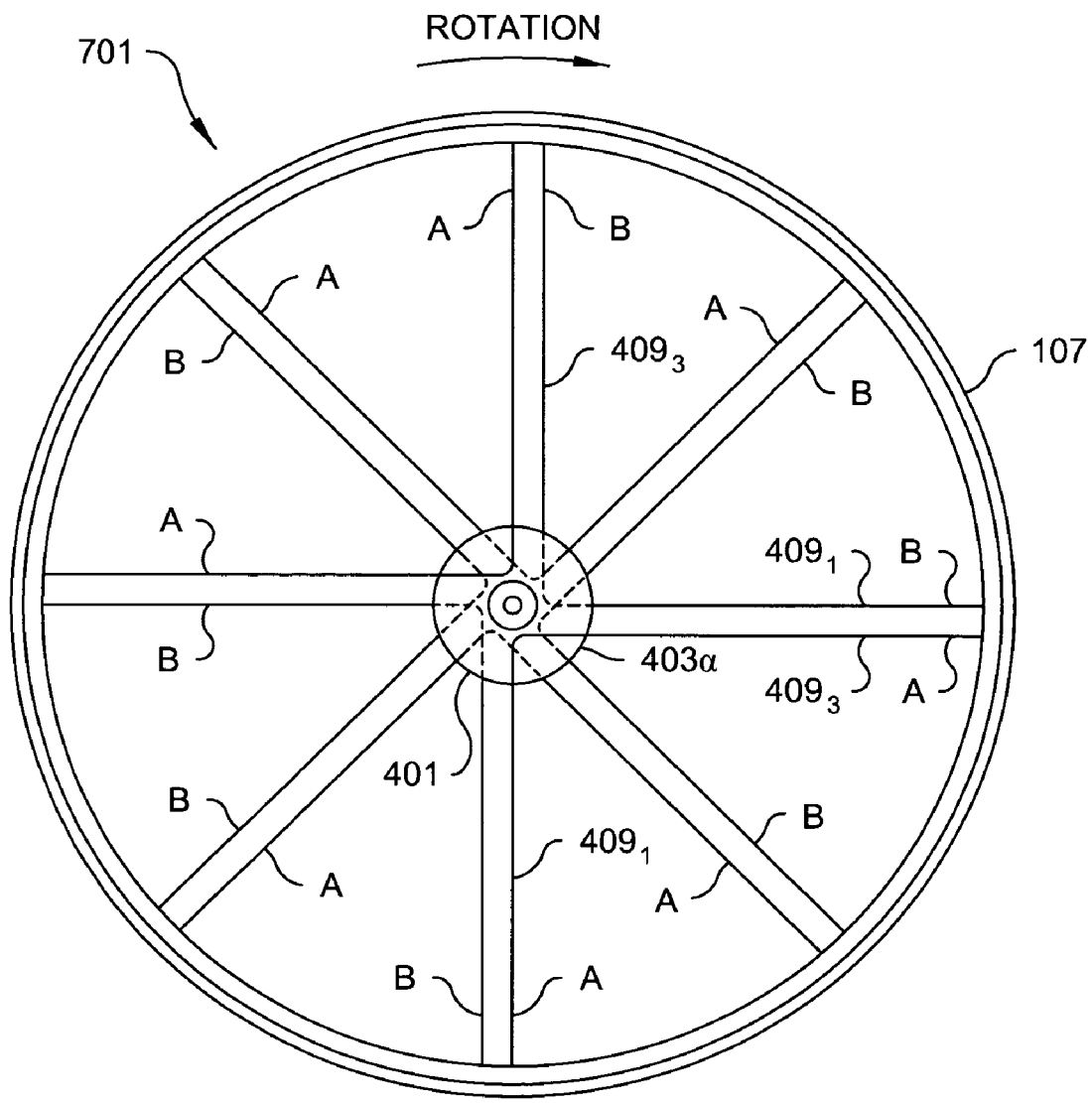
FIG. 7 is an exemplary wheel embodiment.

FIG. 7 shows an exemplary rear wheel 701 comprising a hub 401, four spokes 201 per wheel side and a rim 107. One skilled in the art recognizes that a number of different spoke arrangements with corresponding cradle curves and lengths may be practiced. For example, a wheel may employ more spokes on the drive train side than the opposite side and have different radial and non-radial sub-spoke arrangements. The complete wheel 701 may be laterally trued (eliminating local deviations of the rim 107 to the left or right of center M), vertically trued (eliminating local deviations of the wheel radius (the distance from the rim to the center of the hub)), and dish centered (centering the rim plane M between the outside ends of the hub 401). The dish may be symmetrical on a front wheel. On a rear wheel, dish will be asymmetrical to accommodate the drive train cassette.

Two A side spokes use non-radial/radial cradle curves 407 on the external surface of the A side hub flange 403α (shown solid). The other two A side spokes use non-radial/radial cradle curves 407 on the internal surface of the A side hub flange 403α (shown broken). Similarly, two B side spokes use non-radial/radial cradle curves 407 on the external surface of the B side hub 401 flange 403β (shown broken) and the other two B side spokes use non-radial/radial cradle curves 407 on the internal surface of the B side hub 401 flange 403β (shown broken). Unlike conventional hub-spoke attachments which are typically apertures through a flange perpendicular with the hub body, and localize spoke head-elbow load at one point, the cradles c distribute spoke 201 load C over the entire cradle curve length.

The exemplary wheel 701 pairs an A side sub-spoke with a B side sub-spoke. Each pair comprises a radial and non-radial sub-spoke meeting at the rim 107 at approximately the same location. If a rim has sufficient width, or by use of a connection element (not shown), the A side sub-spoke and B side sub-spoke may be connected to the rim substantially at the same point effecting a triangle vertice. The connection element may be configured to simultaneously tension the A side sub-spoke/B side sub-spoke pair.

In a variant of the wheel 701, the A side hub flange 403α may be indexed clockwise or anti-clockwise with respect to the B side hub 401 flange 403β, further separating the A sub-spokes from the B side sub-spokes at the rim 107.

One or more embodiments of the present invention have been described. Nevertheless, it will be understood that various modifications may be made without departing from the spirit and scope of the invention. Accordingly, other embodiments are within the scope of the following claims.

What is claimed is:

1. A bicycle wheel having flexible spokes comprising:
a wheel rim having a predefined even number of spoke couplings along an inner circumference, the wheel rim further having a surface for attachment of a bicycle tire;

each flexible spoke is a cable having a length defined by two end terminations, wherein a termination couples with a spoke coupling; and a rotatable wheel hub comprising:
- a hub body positioned approximately at a rotational center of the wheel rim;
- a left flange separated by a predefined axial distance along the hub body from a right flange, the left and right flanges extend radially outward toward the wheel rim from the hub body and have a radial edge;
- a left flange outer surface that converges towards the wheel rim spoke couplings and a right flange outer surface that converges towards the wheel rim spoke couplings; and
- means for securing a respective flexible spoke onto one of the left and right flange outer surfaces.

2. The wheel according to claim 1 wherein the means for securing a respective flexible spoke comprises:
- a first cradle located on the outer surface of the left flange; and
- a second cradle located on the outer surface of the right flange, each cradle comprising:
  - a groove having two ends that open at a flange radial edge;
  - a groove cross section configured to receive a flexible spoke; and
  - an undercut load bearing curve defined between the groove ends.

3. The wheel according to claim 2 wherein a cradle curve defines the geometry of a respective flexible spoke from a cradle groove opening to a wheel rim spoke coupling as a tangential sub-spoke or a radial sub-spoke.

4. A bicycle wheel having flexible spokes comprising:
- a wheel rim having a predefined even number of spoke couplings along an inner circumference, the wheel rim further having a surface for attachment of a bicycle tire;
- each flexible spoke is a cable having a length defined by two end terminations, wherein a termination couples with a spoke coupling; and
- a rotatable wheel hub comprising:
  - a hub body positioned approximately at a rotational center of the wheel rim;
  - a left flange separated by a predefined axial distance along the hub body from a right flange, the left and right flanges extend radially outward toward the wheel rim from the hub body and have a radial edge;
  - a left flange inner surface that converges towards the wheel rim spoke couplings and a right flange inner surface that converges towards the wheel rim spoke couplings; and
  - means for securing a respective flexible spoke onto one of the left and right flange inner surfaces.

5. The wheel according to claim 4 wherein the means for securing a respective flexible spoke comprises:
- a first cradle located on the inner surface of the left flange; and
- a second cradle located on the inner surface of the right flange, each cradle comprising:
  - a groove having two ends that open at a flange radial edge;
  - a groove cross section configured to receive a flexible spoke; and
  - an undercut load bearing curve defined between the groove ends.

6. The wheel according to claim 5 wherein a cradle curve defines the geometry of a respective flexible spoke from a cradle groove opening to a wheel rim spoke coupling as a tangential sub-spoke or a radial sub-spoke.

7. A wheel hub comprising:
- a hub body;
- a left flange separated by a predefined axial distance along the hub body from a right flange, the left and right flanges extend radially from the hub body and have a radial edge; and
- a left flange outer surface that converges towards a wheel median plane which is orthogonal to a hub axis midpoint and a right flange outer surface that converges towards the wheel median plane; and
- means for securing a respective flexible spoke onto one of the left and right flange outer surfaces, wherein the flexible spoke is a cable.

8. The wheel hub according to claim 7 wherein the means for securing a respective flexible spoke comprises:
- a first cradle located on the outer surface of the left flange; and
- a second cradle located on the outer surface of the right flange, each cradle comprising:
  - a groove having two ends that open at a flange radial edge;
  - a groove cross section configured to receive a flexible spoke; and
  - an undercut load bearing curve defined between the groove ends.

9. The wheel hub according to claim 7 wherein the left and right flanges further comprise:
- a left flange inner surface that converges towards the wheel median plane and a right flange inner surface that converges towards the wheel median plane; and
- means for securing a respective flexible spoke onto one of the left and right flange inner surfaces.

10. The wheel hub according to claim 9 wherein the means for securing a respective flexible spoke comprises:
- a first cradle located on the inner surface of the left flange; and
- a second cradle located on the inner surface of the right flange, each cradle comprising:
  - a groove having two ends that open at a flange radial edge;
  - a groove cross section configured to receive a flexible spoke; and
  - an undercut load bearing curve defined between the groove ends.

* * * * *